United States Patent
Schlatter et al.

[11] Patent Number: 5,950,950
[45] Date of Patent: Sep. 14, 1999

[54] APPARATUS FOR PROCESSING MAGNETIC TAPES

[75] Inventors: Manfred Schlatter, Freiburg; Manfred Schultheiss, Kehl, both of Germany

[73] Assignee: Emtec Magnetics GmbH, Ludwigshafen, Germany

[21] Appl. No.: 09/063,037

[22] Filed: Apr. 21, 1998

[51] Int. Cl.[6] .......................... B65H 59/38; B65H 23/06
[52] U.S. Cl. ................... 242/334; 242/420.6; 242/538.2; 360/71
[58] Field of Search ...................... 242/334, 410, 242/420, 420.6, 538.2; 360/71; 427/172

[56] References Cited

U.S. PATENT DOCUMENTS

| 4,994,305 | 2/1991 | Yamanaka et al. | 427/132 |
| 5,718,394 | 2/1998 | Simons et al. | 242/420.6 |

FOREIGN PATENT DOCUMENTS

| 709 832 | 5/1996 | European Pat. Off. |
| 44 47 031 | 7/1996 | Germany . |
| 44 47 032 | 7/1996 | Germany . |

OTHER PUBLICATIONS

OZ 0078/6268 English Text of GM 297 00 458.
Abstract of 4–105898, Sony Corp, Surface Treating Device for Magnetic Recording Medium and Surface Treatment of Magnetic Recording Medium.
Pat. Abst. of Japan, vol. 16, No. 504 (P–1439), Oct. 19, 1992 (JP 4182929, Jun. 30, 1992).
Pat. Abst. of Japan, vol. 96, No. 3, Mar. 29, 1996 (JP 7307023, Nov. 21, 1995).

Primary Examiner—John Q. Nguyen
Attorney, Agent, or Firm—Keil & Weinkauf

[57] ABSTRACT

A mechanical and finishing and/or signal processing apparatus for tapes, in particular magnetic tapes, includes at least two tape transporting devices, which apply an average tape tension of 2 N per inch (25.4 mm) of tape width and consequently remain below about 20% of the maximum tensile force of the tape material, to avoid permanent material deformations. The processing devices may be smoothing, abrading, polishing and cleaning devices and also signal recording/reproducing devices and/or signal or tape quality control devices.

7 Claims, 3 Drawing Sheets

APPARATUS FOR PROCESSING MAGNETIC TAPES

FIELD OF THE INVENTION

Apparatus for processing magnetic tapes cut to their final width by means of a total number of processing units arranged one behind the other and at least one tape transporting device.

BACKGROUND OF THE INVENTION

JP-A-5-282665 discloses a surface finishing device for magnetic media in which the aluminum surface of a rotary body is brought into contact with the magnetic coating. Arranged between the unwinding reel and the winding-up reel is an air damper for regulating the tape tension and a blade device for removing projections from the surface of the coating. After this, the rotary body comes into action for cleaning and smoothing the partially destroyed coating surface.

EP-A-709 832 discloses a further surface finishing device for individual magnetic tapes, in which the magnetic tape is pressed by means of an air stream against a lapping band of a lapping device and projections and deposits are removed from the magnetic coating. In this case, the tape tension is measured either before or after the lapping device as a reference value for the respective tape tension after or before the lapping device and the flow of the air stream device is controlled such that both tape tensions are optimized, so that dropouts during magnetic tape recording/playback are eliminated. These controlling and regulating operations are carried out independently of mechanical parameters of the magnetic tape.

SUMMARY OF THE INVENTION

It is an object of the present invention to provide an apparatus for multi-stage processing of magnetic tapes cut to their final width, without the magnetic tapes being subjected unduly to mechanical stress in spite of a high processing rate.

We have found that this object is achieved with an apparatus for processing magnetic tapes cut to their final width by means of a total number of processing units arranged one behind the other and at least one tape transporting device, by at least two substantially slipless tape transporting devices, which separate the total number of processing stations into groups, each tape transporting device applying somewhat more than an average tape tension of about 2 N per inch of tape width, which the processing group lying ahead of it in the tape transporting direction requires, and the maximum value of the tape tension lying in the elastic tensile force range of the material of at least about 20% below the maximum permissible tensile force of the magnetic tape.

As a result, multi-stage processing is made possible in one unit, with tension release between the individual operating steps, by tape transporting drives arranged one behind the other, and the advantage of arranging any number of processing units one behind the other is also achieved.

In a practical embodiment, the tape transporting devices are designed as vacuum rollers with drive motors, whereby any slip is virtually eliminated.

In a further development, at least one compensating roller may be mounted ahead of each tape transporting device and in such a way that it can be changed in its location, and there may be provided a position sensor device, which senses the momentary contact of the compensating roller and generates a position-dependent signal for the speed control of the tape transporting device.

As a result, under conditions in which the elongation of the magnetic tapes is not adequate for regulating the synchronous operation of successive drives, excellent synchronization control can be achieved, since the compensating rollers allow brief differences in the speed and number of revolutions of the vacuum rollers without appreciable changes in tape tension occurring.

The apparatus according to the invention can be used advantageously for the surface finishing of the magnetic tapes.

However, it is also expedient to use one or more signal recording and reproducing devices as a processing unit or processing units in the apparatus according to the invention or else a combination of surface finishing units and signal processing units.

It is commercially advantageous if the tape transporting devices transport the magnetic tape at a speed of about 10 m/s to about 15 m/s.

SHORT DESCRIPTION OF THE DRAWINGS

An exemplary embodiment of the apparatus according to the invention is described below with reference to a drawing, in which.

DETAILED DESCRIPTION

Figure 1:
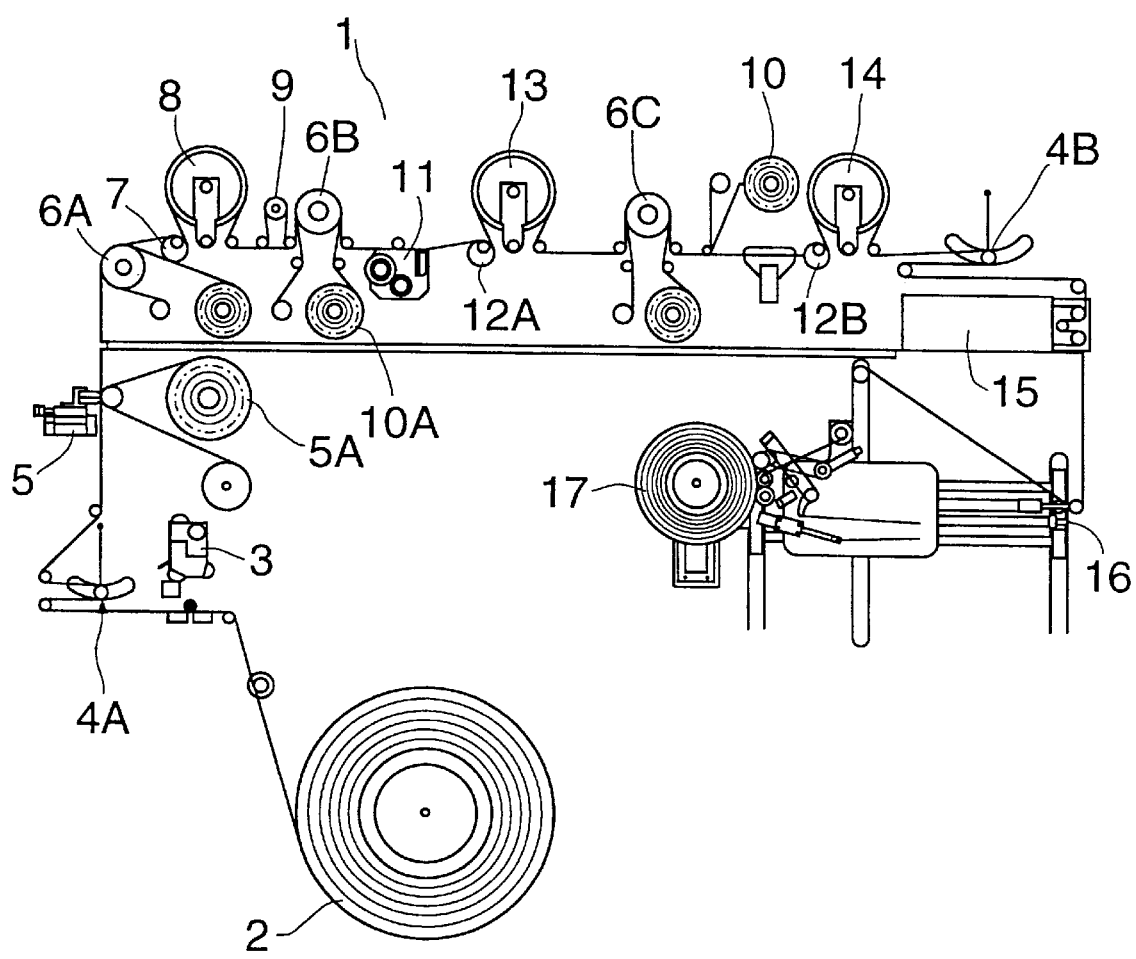
FIG. 1 shows an apparatus for the surface finishing of magnetic tapes

On an unwinding unit 2, driven by means of an electric motor, of a processing apparatus 1 there is a full tape pancake 2, which is to be processed. The tape B runs from the unwinding roll 2 via a compensating roller 4A, which like all the following rollers is equipped with a position sensor device (not shown), and which generates by means of this position sensor device control signals for regulating the tape tension and emits them to the electric motor of the unwinding roll 2.

The tape B passes via deflecting rollers to the tape abrading or burnishing station 5, in which an abrasive band is passed from a supply roll 5A over the tape B in contact with its coating side. In the subsequent cleaning station 6A, which comprises a supply roll and winding-up roll of a cleaning band, for example of a nonwoven material, abrasive dust or particles produced during the abrading process are in turn removed by passing the cleaning medium over the tape, in contact with it. The next unit is a tape tension measuring unit 7, by means of which the momentary tape tension is sensed in a way similar to a compensating roller/position sensor device but is indicated by means of a measuring device (not shown).

There then follows in the tape running direction the first tape transporting device 8, comprising a vacuum roller with an electric motor as the drive.

This first tape transporting device 8 serves at the same time as a main drive of the processing apparatus 1, that is to say it acts as a "master" for the subsequent tape transporting devices 13 and 14, the slaves.

The vacuum rollers of the tape transporting devices 8, 13 and 14 operate like commercially available vacuum rollers, adapted to a half-inch tape width (12.7 mm) in the example described. A cylindrical casing with openings or bores rotates about a fixed (non rotating) inner part. Thus, if a vacuum is applied via the inner part, air flows from outside to inside through the openings/bores in the cylindrical casing, only the upper half of the circumference of the cylindrical casing being exposed. The openings/bores in the cylindrical casing are then covered by the tape B lying over it, whereby the tape is pressed securely on the circumference of the cylindrical casing, inwardly by the vacuum, from outside by means of the air pressure, so that the tape transport can be realized without any slip, in other words sliplessly.

After the first tape transporting device, the tape B is taken via a polishing or finishing station 9, which may comprise, for example, a rotating polishing element with a thread-like structure on the circumference, for reducing the abrasiveness and the particle shedding of coated tapes (DE-U-29700458), but may also be of any other design suitable for polishing.

Thereafter, another cleaning station 6B—as described above—may be provided. The next station may be a blade surface-finishing unit 11, in which particles protruding from and/or resting on the coating side of the tape B can be stripped off it by means of a sapphire blade. The sapphire blade itself should in this case be removable from the area of tape contact by means of a swivelling mechanism, which is required, for example, whenever a splice runs through. As a result, not only can the sapphire blade be protected from damage, but soiling of it by adhesive can also be avoided. The sapphire blade may also be assigned its own cleaning device (not shown).

Provided between the blade unit 11 and the second tape transporting device 13 is a compensating roller 12A by which the tape tension is preset and at the same time the speed of the drive motor of the device 13 is regulated. After the second tape transporting device 13, the tape B passes via the intensive cleaning station 6C, which may be constructed in the same way as the stations 6A and 6B and in which a special cleaning nonwoven material may be used. In the subsequent cleaning station 10, the backing of the tape B is cleaned of any dirt or particles which may be present or may be produced during processing.

The as yet unmentioned units 12B, the compensating roller and the third tape transporting device 14, have the same construction and the same functions as the compensating roller 12A and tape transporting device 13 described above.

The final subsequent compensating roller 4B corresponds to the compensating roller 4A after the unwinding unit 2, the only difference being that 4B is used to regulate the speed of the winding-up motor of the winding-up unit 17.

The sensing device 15 provides a defect searching device for the surface of the tape, by which defective tapes can be discovered and segregated.

By means of a winding aid based on the contact-winding or central-winder principle (DE-A-44 47 032 and DE-A-44 47 031 of the Applicant), the finished tape B is wound up on a hub holder, which is mounted on the spindle of a variable-speed electric motor.

Figure 3:
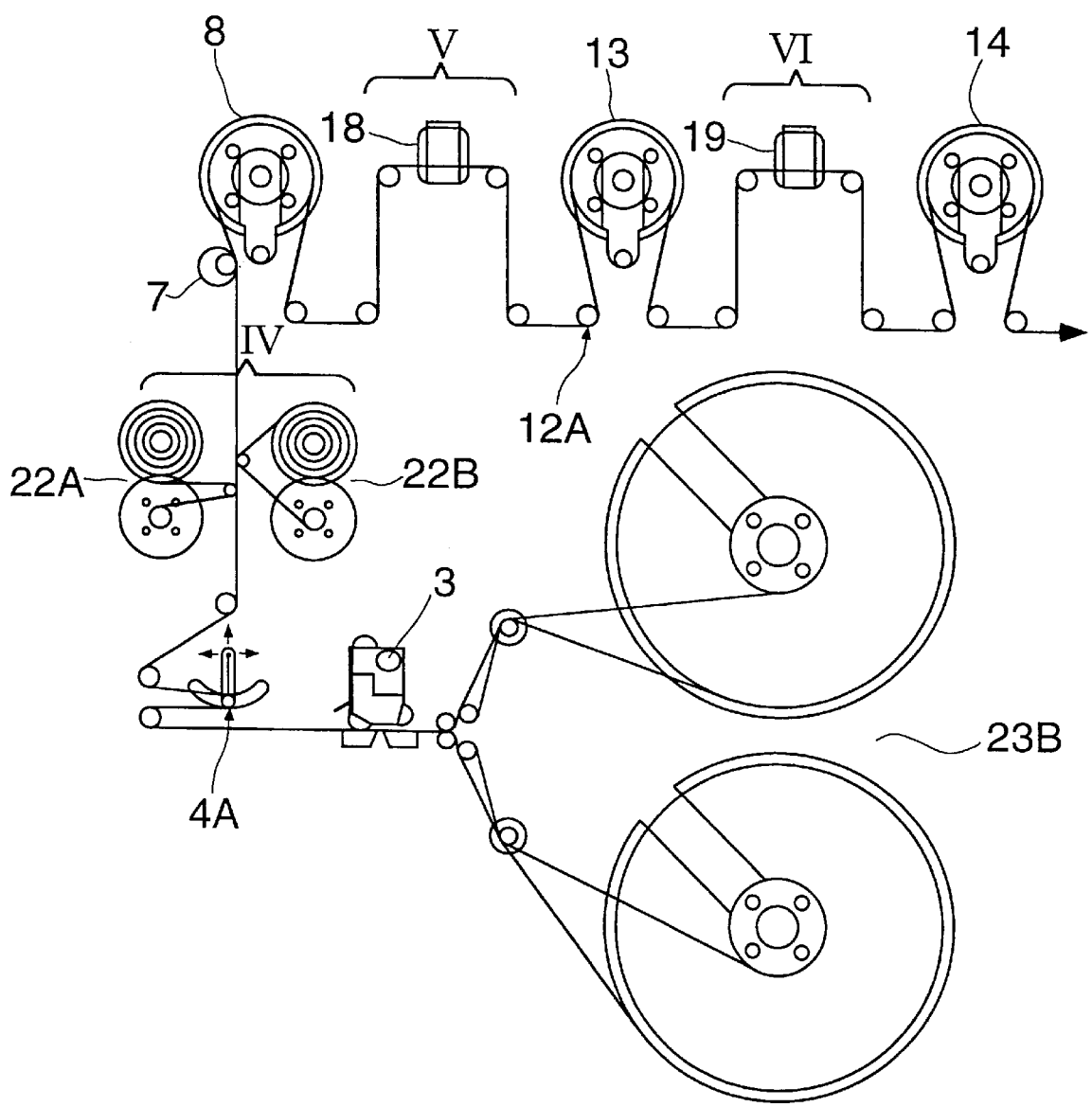
FIG. 3 shows an apparatus for signal recording/reproduction on and from magnetic tapes.

FIG. 3 shows a variant 20 of the apparatus 1 from FIG. 1.

In it, the left-hand part of the apparatus 1 from FIG. 1 has been modified to the extent that an automatic reversible winding device 23 is provided. Apart from an adhesive splicing device 3, provided in the tape running direction are the compensating rollers 4A and, thereafter, cleaning devices 22A and B—corresponding to the cleaning devices 6A–C in FIG. 1—for both sides of the tape.

It goes without saying that, if the tape B is to be surface-finished, these cleaning devices 22A and B may be replaced by a one-side or else two-side abrading and cleaning device, such as for example 5A and 6 or 22. In the case of abrasive working and cleaning on one side, for example by means of 5A and 6A, a cleaning device 6 or 22 is nevertheless necessary on the opposite side, in order to ensure good freedom from dust and particles of the tape B.

There then follow the tape tension measuring unit 7 and a first, second and third tape transporting device 8, 13 and 14 from FIG. 1 with a compensating roller 12A before 13 and 12B before 14. Between the devices 8 and 13 and 13 and 14 there are provided in each case reading/writing stations 18 and 19 instead of the mechanical surface finishing units 9, 6B and 11 as well as 6C and 10. However, combinations of electrical processing units and mechanical surface finishing units are also conceivable.

By means of the units 18 and 19, servotrack signals or other control signals, for example, may be written onto the tape B and subsequently read, i.e. checked. In principle, it is also possible to perform straightforward tape quality control (verifying) by writing special signals on and subsequently reading and erasing them.

The tape tension must be set very accurately and be kept constant in this processing device 20 in order for the same conditions to be provided as a basis in each case for the writing and reading operations.

It has been found that the processing devices 5, 5A and 6A; 9, 6B and 11; 6C and 10 (FIG. 1) and 22A and 22B; 18; 19 (FIG. 3) before and between the tape transporting devices 8, 13 and 14 oppose the transporting of the tape B with a resistance which can be applied by tape tension. If the necessary tape tension were applied by a single tape transporting device, in the case of a half-inch tape (12.7 mm) it should be about 2 N. With the sensitive magnetic tapes, this may, however, depending on the thickness of the tape, already lead to permanent deformation damage on a half-inch tape.

It has therefore been found that, with at least two, substantially slipless tape transporting devices, the necessary tape tensions can be lowered if said devices divide the total number of processing units into groups.

The following may be identified as such groups

| FIG. 1 | 5, 5A and 6A | (Group I) |
|---|---|---|
|  | 9, 6B and 11 | (Group II) |
|  | 6C and 10 | (Group III) |
| FIG. 3 | 22A and 22B | (Group IV) |
|  | 18 | (Group V) |
|  | 19 | (Group VI) |

Surprisingly, substantially the same tape tension of about $\Delta P+P$ must be applied for the individual groups, since the tape tension of magnitude P is "used up" by the processing devices of one group and a residual tape tension $\Delta P$ also has to be present after the tape transporting devices 8, 13 and 14 (and others, if advantageous), which have to apply the tape tension by tensile force.

The magnitude of this tape tension $P+\Delta P$ also depends, however, on the still maximum permissible tensile force range of the tape material and must be safely far enough below the maximum to exclude with certainty any permanent deformation of the tape.

The following consequently apply (in each case per inch of tape width (25.4 mm))

$$P \leq 2N$$

and $$\Delta P \sim 0.1 - 0.4 N.$$

(The maximum tensile force range for customary ½-inch tapes for audio/video recording is about 0.2–1 N.)

This ensures that the maximum tape tension $P+\Delta P$ or $P+2\Delta P$ lies at least 20% below the maximum permissible tensile force of customary magnetic tapes and nevertheless the maximum tape tension is applied, to allow operating at high processing and transporting speeds of about 10 m/s to about 15 m/s.

The apparatus is consequently also designed favorably in energy terms. The electric motors driving the vacuum rollers of the tape transporting devices 8, 13, 14 (and others if appropriate) may be selected according to a fixed optimum speed characteristic, since the speed control range used by the compensating rollers 12 is relatively narrow. As briefly mentioned above, for control purposes, the momentary position of the compensating roller 12 is enquired by means of the electrical position sensor. If the assigned tape transporting device (8, 13, 14) is pulling too quickly, the compensating roller 12 moves upward, and the respective tape transporting device is fed a "slower" control signal by the position sensor electronics as a result of the raised position of the compensating roller 20, until the compensating roller 12 returns again to its desired position, and vice versa.

The unwinding and winding-up tensile forces are in FIG. 1, for example, $\Delta P$ and $2\Delta P$ and, in this set-up, are adapted to the other tape tensile forces of the apparatus.

Both during the abrading and the cleaning of the tape B, the nonwoven material or abrasive band is moved slowly counter to the tape running direction. When a roll is full and has to be changed, these units for cleaning and abrading can be stopped.

The configuration of the apparatus 20 in FIG. 3 is equipped with a reversible winding unit 23, which allows a fully automatic roll change and is novel and very advantageous for a signal recording/reproducing (processing) apparatus and, for example, also for an audio or video recording system. Such a reversible winding unit is also advantageous on the winding-up side of the recording/reproducing systems. It goes without saying that this also applies to servotrack recording systems!.

The tape tension conditions must be set very accurately for the writing (recording) and reading (reproducing) operations and must be matched to one another. The tape tensions P in these cases lie in the range from about 1 N to about 2 N for half-inch tapes.

Figure 2:
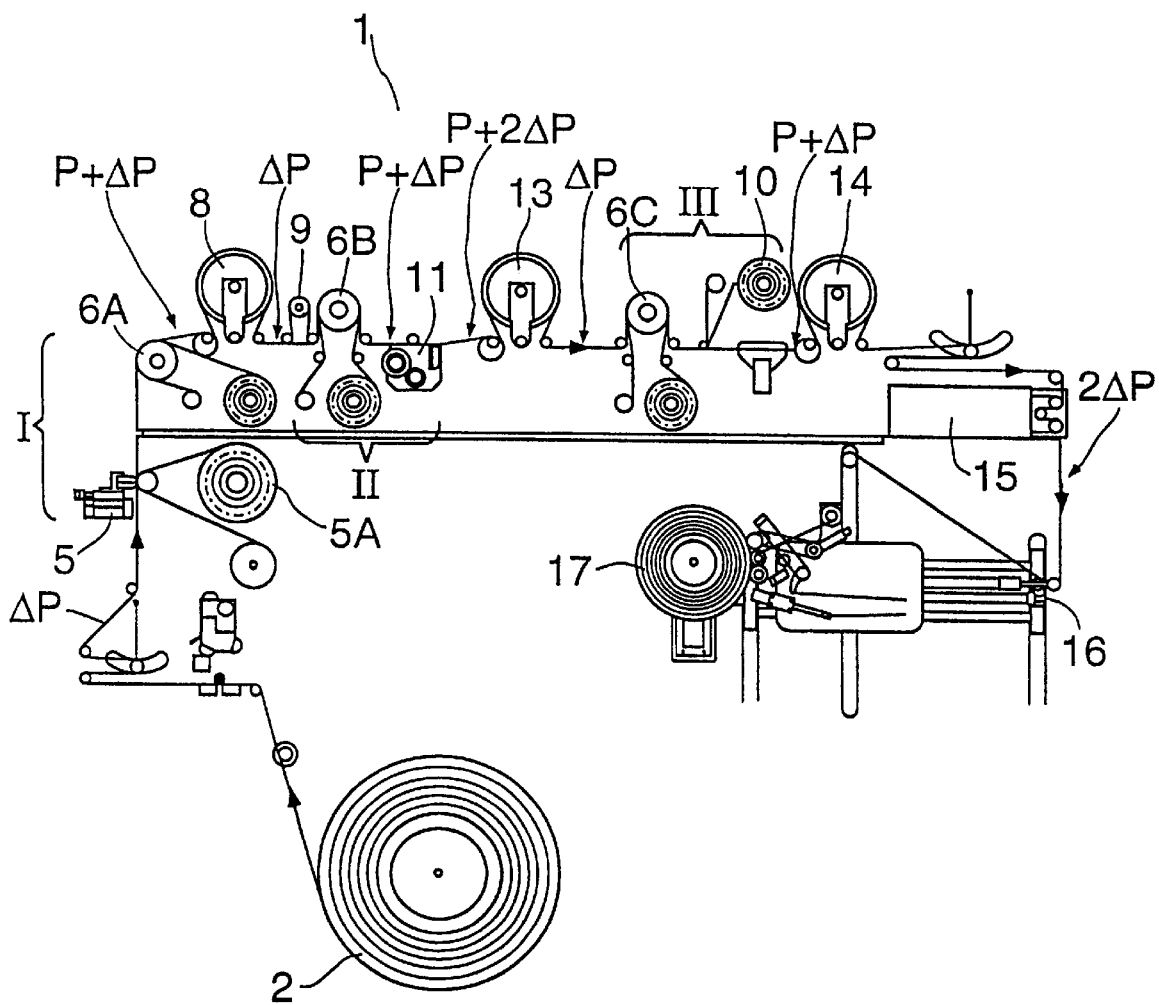
FIG. 2 shows the apparatus according to FIG. 1 with tape tensions indicated

The requirement for relatively high tape tension values can be met very well by the apparatus according to the invention, and substantially the same limit values and orders of magnitude as already described with respect to FIGS. 1 and 2 apply.

The apparatuses 1 and 20 described can be used for all common tape widths of customary magnetic tapes for analog and digital recording.

It has emerged as a special advantage that mechanical finishing of the quality achieved in this way was not possible in the case of an uncut wide magnetic film web of about 20 inches in width (500 mm) or more, since not all the regions of the tape surface could be uniformly finished. The apparatus according to the present invention has, in particular, the following advantages:

different processing steps can be carried out in a single pass, to be more precise in a single unwinding and winding-up operation, the relatively high tape tension necessary for a plurality of processing steps can be applied without damaging the tape and for high tape transporting speeds changes, restrictions and expansions of the apparatus are possible in a simple way without any problems, since this merely requires exchanging, removing or adding processing units by retaining, reducing or adding to the tape transporting devices.

The invention relates to a mechanical finishing and/or signal processing device for tapes, in particular magnetic tapes, and includes at least two tape transporting devices, which apply an average tape tension of 2 N per inch (25.4 mm) of tape width and consequently remain below about 20% of the maximum tensile force of the tape material, to avoid permanent material deformations. The processing devices may be smoothing, abrading, polishing and cleaning devices and also signal recording/reproducing devices and/or signal or tape quality control devices.

We claim:

1. Apparatus for processing magnetic tapes cut to their final width by means of a total number of processing units arranged one behind the other and at least one tape transporting device, which apparatus comprises at least two substantially slipless tape transporting devices which separate the total number of processing units into groups (I–III and IV–VI), each tape transporting device applying somewhat more than an average tape tension of about 2 N per inch of tape width, which the processing group lying ahead of each tape transporting device in the tape transporting direction requires, and the maximum value of the tape tension lying in the elastic tensile force range of the material of at least about 20% below the maximum permissible tensile force of the magnetic tape.

2. Apparatus as claimed in claim 1, which comprises vacuum rollers with drive motors as said tape transporting devices.

3. Apparatus as claimed in claim 1, which comprises at least one compensating roller, which is mounted ahead of each tape transporting device and can be changed in location, and a position sensor device, which senses the momentary contact of the compensating roller and generates a position-dependent signal for the speed control of the tape transporting device.

4. Apparatus as claimed in claim 1, which comprises processing units for the surface finishing of the magnetic tapes.

5. Apparatus as claimed in claim 1, which comprises at least one signal recording and reproducing device as a processing unit, the average tape tension lying in the range of 2 N per inch of tape width.

6. Apparatus as claimed in claim 5, wherein said apparatus has at least one signal recording and/or reproducing device and at least one reversible winding unit is provided.

7. Apparatus as claimed in claim 1, wherein the tape transporting devices transport the magnetic tape at a speed of about 10 m/s to about 15 m/s.

\* \* \* \* \*

UNITED STATES PATENT AND TRADEMARK OFFICE
CERTIFICATE OF CORRECTION

PATENT NO.: 5,950,950

DATED: September 14, 1999

INVENTOR(S): SCHLATTER et al.

It is certified that error appears in the above-identified patent and that said Letters Patent is hereby corrected as shown below:

On the title page:

Insert the following priority data on the cover sheet:

--[30] Foreign Application Priority Data
April 15, 1997   [DE]   Germany ............... 297 06 768.0--.

Signed and Sealed this

Eighteenth Day of April, 2000

Attest:

Q. TODD DICKINSON

*Attesting Officer*          *Director of Patents and Trademarks*